W. G. STEWART.
THRESHER BAND CUTTER AND FEEDER.
APPLICATION FILED NOV. 6, 1913.

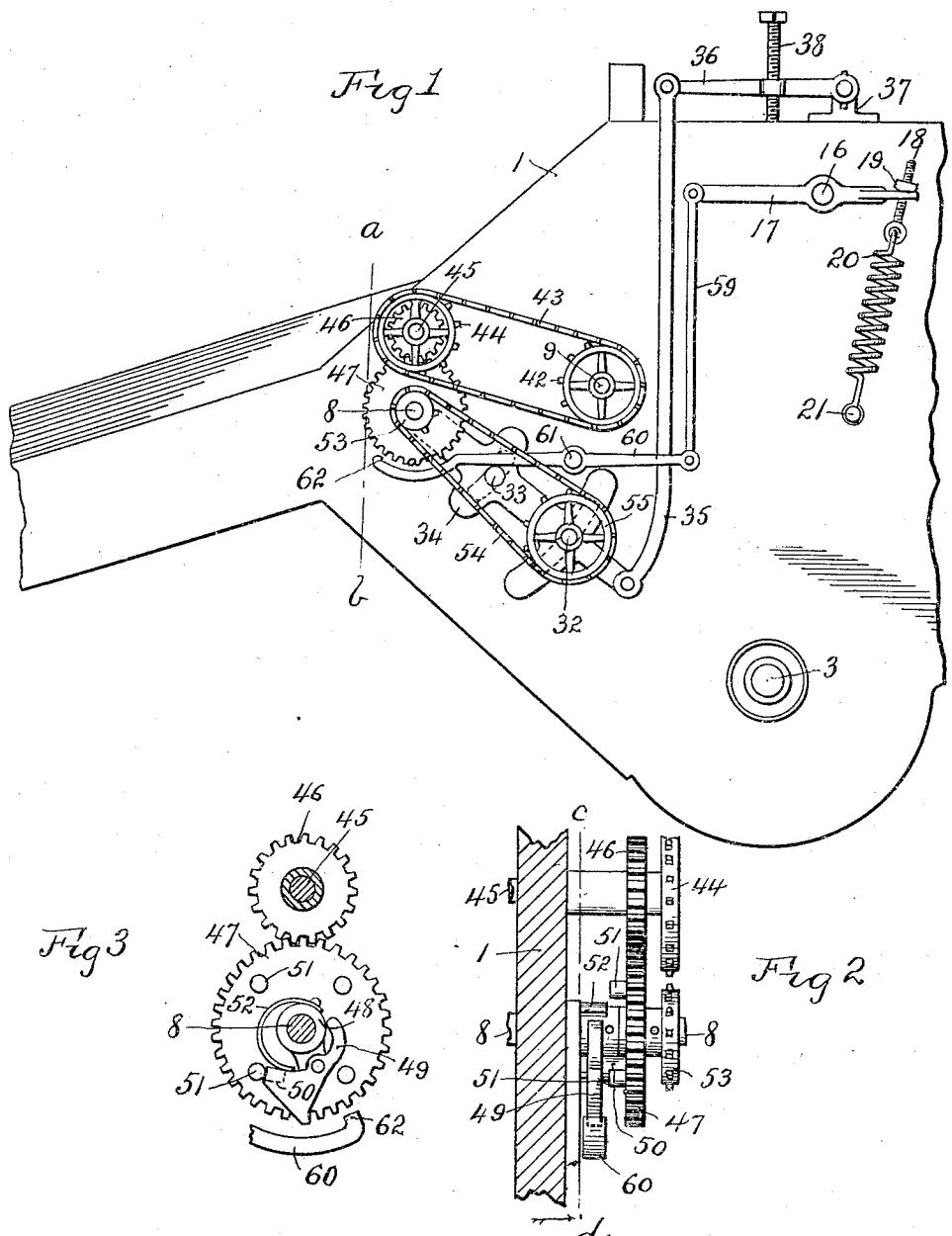

1,200,667.

Patented Oct. 10, 1916.
3 SHEETS—SHEET 2.

WITNESSES:
R. L. Hamilton
E. B. House

INVENTOR.
William G. Stewart
BY
Warren D. House
His ATTORNEY.

W. G. STEWART.
THRESHER BAND CUTTER AND FEEDER.
APPLICATION FILED NOV. 6, 1913.
1,200,667.
Patented Oct. 10, 1916.
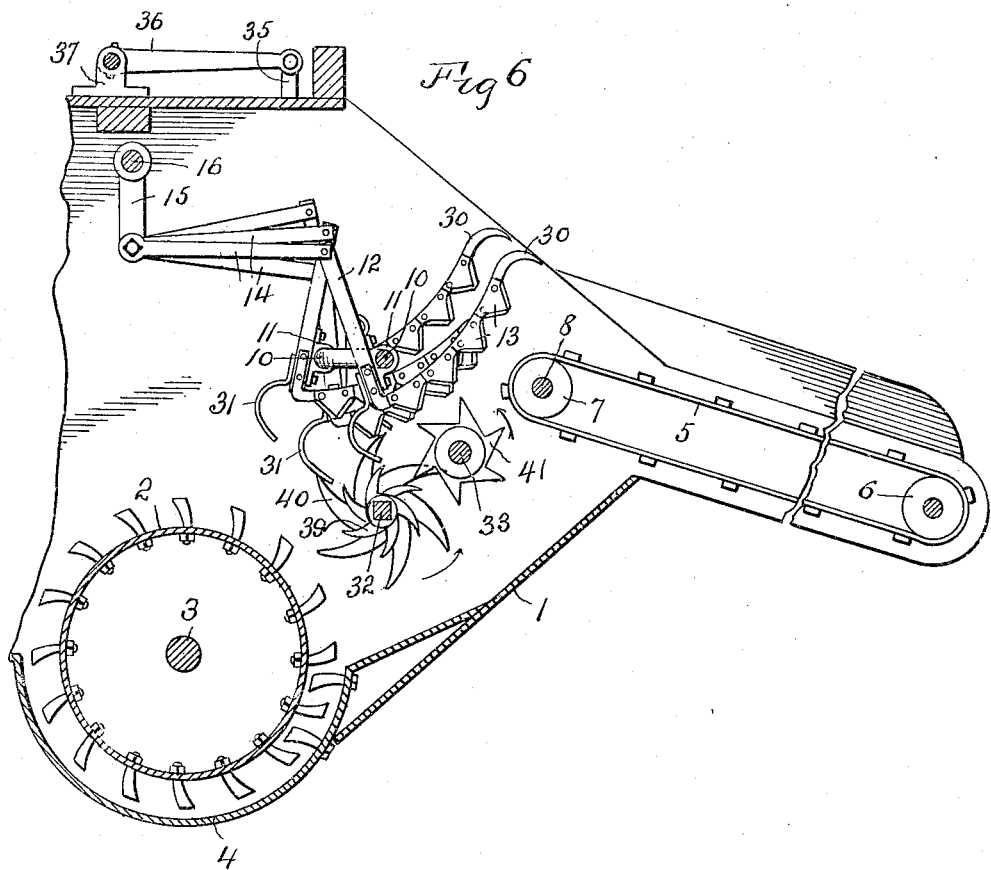

UNITED STATES PATENT OFFICE.

WILLIAM G. STEWART, OF KANSAS CITY, KANSAS.

THRESHER BAND-CUTTER AND FEEDER.

1,200,667.  Specification of Letters Patent.  Patented Oct. 10, 1916.

Application filed November 6, 1913. Serial No. 799,491.

*To all whom it may concern:*

Be it known that I, WILLIAM G. STEWART, a citizen of the United States, residing at Kansas City, in the county of Wyandotte and State of Kansas, have invented certain new and useful Improvements in Thresher Band-Cutters and Feeders, of which the following is a specification.

My invention relates to improvements in thresher band cutters and feeders.

The object of my invention is to provide novel mechanism for automatically controlling the feeding of grain to a threshing cylinder so as to obtain an even feed of the grain and the prevention of slugging or choking of the cylinder.

A further object of my invention is to provide novel and efficient means by which the bundles of grain may be properly and automatically positioned upon their delivery to the threshing cylinder.

Other novel features of my invention are hereinafter fully described and claimed.

Figure 4:
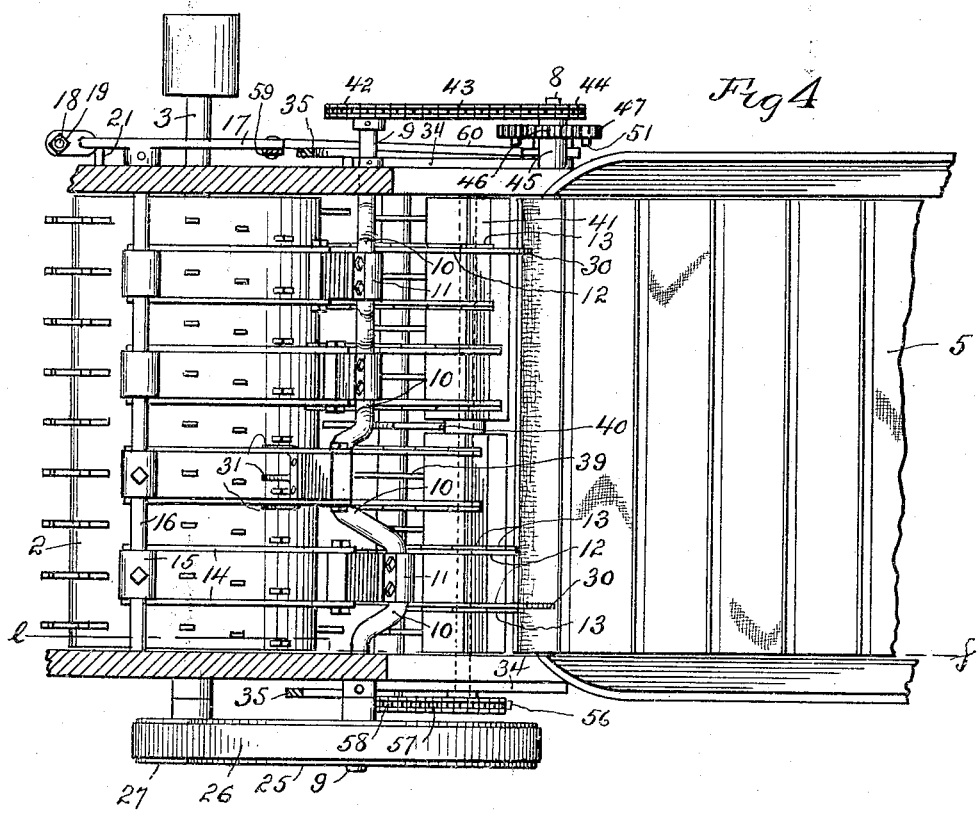
Figure 5:
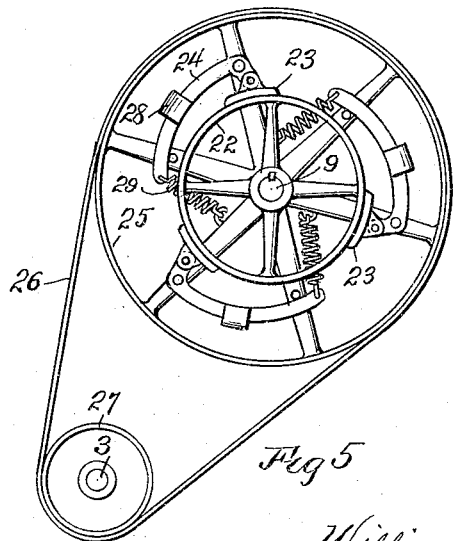

In the accompanying drawings which illustrate the preferred embodiment of my invention—Figure 1 is a side elevation of the forward part of a threshing machine, which is equipped with my improvement. Fig. 2 is an enlarged vertical section on the line *a—b* of Fig. 1. Fig. 3 is a vertical sectional view on the line *c—d* of Fig. 2. Fig. 4 is a plan view of what is shown in Fig. 1. Fig. 5 is a side elevation of some of the driving mechanism. Fig. 6 is a vertical sectional view on the line *e—f* of Fig. 4.

Similar reference characters designate similar parts in the different views.

1 designates the body of the threshing machine, 2 the usual threshing cylinder, mounted on a driving shaft 3, and coöperating with the usual concave 4.

The bundle carrier comprises the usual endless belt 5, mounted on an idle roller 6 and a roller 7, secured to a horizontal transverse shaft 8.

9 designates a rotary shaft, having four cranks 10 set quartering, said cranks having respectively rotatively mounted on them, by means of bearings 11, four band cutting devices, comprising each a right angled member 12, one arm of which is disposed at the rear of the roller 7 and is provided with cutting blades 13, of triangular form, similar to the blades of a reaper. The other arms of said right-angled members are respectively pivoted to rearwardly extending links 14, respectively pivoted at their rear ends to cranks 15, secured to a rock shaft 16, having its ends extending through and pivotally mounted in the side walls of the body 1.

Outside the body 1 and secured to the rock shaft 16, is a lever 17, through one end of which extends an adjusting screw 18, provided with a nut 19, which bears against the upper side of the lever 17, the lower end of the screw 18 being attached to the upper end of a coil spring 20, the lower end of which is fastened to a bolt 21, which is mounted in the side wall of the body 1.

The crank shaft 9 is driven by means of a friction wheel 22, Fig. 5, against the periphery of which are adapted to bear friction blocks 23, carried by levers 24, pivoted to the spokes of a pulley wheel 25, which is driven by a belt 26, mounted on a pulley 27, which is secured to the driving shaft 3. The levers 24 carry weights 28, which swing said levers by centrifugal force into contact with the friction wheel 22, said centrifugal action being resisted by springs 29, respectively connected to said levers and to the spokes of the wheel 25.

From the above it will be understood that when the crank shaft 9 is rotated by means of the mechanism just described, the right angled members 12 of the band cutting devices will have imparted to them a combined circular and reciprocating movement, whereby bundles of grain carried upwardly on the belt 5, will have their bands cut by the blades 13, which at the same time will have a clawing movement tending to drag the grain from the carrier and feed it toward the threshing cylinder 2. It will be noted that the two outer members 12, are provided each at their outer ends with forwardly and downwardly curved hooks or claws 30, the function of which is to hook into a bundle which has been turned partly crosswise on the belt 5, and pull it around toward the proper longitudinal position.

The rear edges of the members 12 have respectively secured to them downwardly curved fork tines 31, Fig. 6, which on the rearward movement of the said members fork the grain toward the threshing cylinder 2.

Intermediate of the threshing cylinder 2, and the roller 7, and parallel therewith, are two shafts 32 and 33, which extend through opposite sides of the body 1 and have their ends respectively mounted in two plates 34, which are pivoted at one set of ends on the shaft 8 and have their other set of ends respectively pivoted to the lower ends of two links 35, the upper ends of which are pivoted to two levers 36, respectively pivoted to bearings 37, which are mounted upon the top of the body 1. One of the levers 36 is provided with a vertical screw threaded opening in which is fitted a vertical adjusting screw 38, the lower end of which is adapted to rest upon the top of the body 1. By adjusting this screw the free ends of the plates 34 may be vertically adjusted, thereby moving the shafts 32 and 33 toward or from the band cutting blades 13, whereby the flow of grain to the cylinder 2 may be controlled as to quantity, said shafts 32 and 33 having mounted thereon respectively the following described feeding devices:—On the shaft 32 are provided a plurality of sets of rearwardly curved radial teeth 39, and a set of similarly curved longer teeth 40, disposed in the longitudinal center of the machine. The shaft 32 and teeth 39 and 40 form a retarder which straightens and holds back the grain. The purpose of having the teeth 40 longer than the teeth 39 is to enable the teeth 40 which engage the grain prior to the time it is engaged by the teeth 39, to pull the grain into longitudinal position if it has moved partly crosswise during its travel.

The shaft 33 has mounted on it and revoluble therewith, a toothed feeding roller 41. The shafts 32 and 33 are rotated in the direction indicated by the arrows in Fig. 6.

I will now describe the mechanism for rotating the shafts 32 and 33 and the shaft 8:—Secured to the crank shaft 9 is a sprocket wheel 42, Fig. 1, which is connected by a chain belt 43 with a sprocket wheel 44, rotatively mounted on a stud 45 and secured to a spur gear wheel 46, which meshes with a spur gear wheel 47, rotatably mounted on the shaft 8, which carries the roller 7. Pivoted, as shown in Fig. 3, to a collar 48, which is rigidly secured to the shaft 8, is a clutch member 49, provided with an outwardly extending projection which is normally adapted to engage any one of four inwardly extending pins 51, secured to the gear wheel 47. A spring 52, secured to the collar 48, normally forces the clutch member 49 to the engaging position shown in Fig. 3, thus when the clutch member 49 is engaged with one of the pins 51, and the gear wheel 47 is rotated the shaft 8 will be rotated by means of the collar 48, thereby driving the endless belt 5 through the intermediacy of the roller 7.

Secured to the shaft 8, as shown in Figs. 1 and 2, is a sprocket wheel 53, which is connected by means of a chain belt 54, with a sprocket wheel 55, which is secured to the shaft 32. The other end of the shaft 32 has secured to it a sprocket wheel 56, which is connected by means of a sprocket chain 57 with a sprocket wheel 58, secured to the shaft 33.

From the foregoing it will be understood that bundles of grain placed upon the carrier belt 5 will be carried upwardly and will pass between said belt and the blades 13, which will cut the bands and at the same time will feed the grain toward the cylinder 2 and into engagement with the toothed drum 41 and the teeth 39 and 40, the fork tines 31 serving to loosen the grain from the teeth 39 and 40 and pitch it toward the threshing cylinder.

In case that too much grain is fed onto the carrier belt 5, the increased quantity, by bearing against the blades 13 of the members 12, will swing those members on the cranks 10 so as to rock the shaft 16 beyond its normal position and against the pressure of the spring 20, which will yield, thereby permitting the forward end of the lever 17, Fig. 1, to be forced downwardly. The forward end of the lever 17 has pivoted to it the upper end of a connecting rod 59, the lower end of which is pivoted to one end of a horizontal lever 60, pivotally mounted on a bolt 61, and provided at its other end with a tooth 62, Fig. 3, which will engage the revoluble clutch member 49 and force it inwardly against the pressure of the spring 52, so as to free the projection 50 on such clutch member, from the pin 51 of the gear wheel 47 with which said projection is at the time engaged. The clutch member 49 being freed from engagement with the gear wheel 47, the shaft 8 carrying said clutch member, will stop rotating thereby causing a cessation of the operation of the carrier belt 5 and the shafts 32 and 33. Slugging of the cylinder will thus be prevented. After the excess of grain has been removed sufficiently to permit the members 12 to reassume their normal positions, the spring 20 will swing the lever 17 so as to withdraw the lever 60 from engagement with the clutch member 49, whereupon the spring 52 will force said clutch member into the position of engagement with one of the pins 51, as shown in Fig. 3, upon which the shaft 8 and the shafts 32 and 33 will resume rotation, and the feeding of the grain will again commence.

The shaft 9, is geared to run at much greater speed than the shafts 32 and 33 and the fork tines 31, therefore, move more rapidly than the teeth 39 and 40, so that the latter serve as retarders which hold back the lower part of the bundle, while the tines 31 loosen the upper part of the bundle and feed it more rapidly to the threshing cylinder 2 than the lower part of the bundle is being fed.

When the shafts 32 and 33 are stopped in their feeding operation by the operation of the clutch mechanism as hereinbefore described, due to the entrance of too much grain, the lower part of the grain which is lying upon the teeth 39, 40 and 41 will remain stationary, while the upper part of the grain is carried forward and fed to the threshing cylinder by the fork tines 31, which serve to comb, straighten and pitch the grain engaged by them.

I do not limit my invention to the structures shown and described, as modifications, within the scope of the appended claims, may be made without departing from the spirit of my invention.

Having thus described my invention, what I claim and desire to secure by Letters Patent, is:—

1. In a thresher band cutter and feeder, an endless carrying belt, a threshing cylinder, and a rotary feeding device intermediate of said belt and cylinder and provided with three sets of radial bundle engaging teeth of which the intermediate set are the longest.

2. In a thresher band cutter and feeder, a rotary feeding device having radial bundle engaging teeth and provided at opposite sides of said teeth with radial bundle engaging teeth shorter than the first named teeth.

3. In a thresher band cutter and feeder, a rotary feeding device having three sets of radial rearwardly curved bundle engaging teeth, the intermediate set being the longest.

4. In a thresher band cutter and feeder, bundle feeding mechanism, a rotary shaft having a crank, a band cutting device pivoted on said crank, a rock shaft having a crank arm, a link connecting said crank arm and said device, spring actuated means for resisting rocking of the rock shaft in one direction, driving means operated by said rotary shaft for operating the bundle feeding mechanism, and means actuated by the rocking of said rock shaft for rendering said driving means inoperative.

5. In a thresher band cutter and feeder, an endless carrying belt, a threshing cylinder, bundle cutting and forking means intermediate of the said belt and cylinder and arranged to have a combined circular and reciprocating movement, and rotary bundle feeding means intermediate of the belt and cylinder and adjustable toward and from said cutting and forking means.

6. In a thresher band cutter and feeder, a supporting frame, an endless carrying belt, a threshing cylinder, bundle cutting and forking means intermediate of said belt and cylinder and arranged to have a combined circular and reciprocating movement, a swinging support pivoted to said frame and movable toward and from said cutting and forking means, rotary bundle feeding means intermediate of the belt and cylinder and carried by said swinging support, and adjustable means carried by said frame for supporting said swinging support in different positions.

7. In a thresher band cutter and feeder, bundle cutting and forking means arranged to have a circular motion combined with a reciprocating motion, and rotary bundle feeding and retarding means adjustable toward and from and adapted to coöperate with said cutting and forking means.

8. In a thresher band cutter and feeder, bundle feeding means, a threshing cylinder, a rotary retarder having radial teeth arranged to penetrate and hold the grain and disposed intermediate of the cylinder and feeding means, a rotary shaft disposed above and at the rear of the axis of the retarder, and means carried by said shaft for forcing the grain between the teeth of the retarder and arranged to then lift the grain from between the teeth of the retarder and to fork it toward the cylinder.

In testimony whereof I have signed my name to this specification in presence of two subscribing witnesses.

WILLIAM G. STEWART.

Witnesses:
  WARREN D. HOUSE,
  E. B. HOUSE.

Copies of this patent may be obtained for five cents each, by addressing the "Commissioner of Patents, Washington, D. C."